(12) United States Patent
De Mol et al.

(10) Patent No.: US 12,520,400 B2
(45) Date of Patent: Jan. 6, 2026

(54) MULTI-CHANNEL DRIVER WITH SWITCHABLE BY PASS CAPACITORS

(71) Applicant: SIGNIFY HOLDING B.V., Eindhoven (NL)

(72) Inventors: Eugen Jacob De Mol, Eindhoven (NL); Henricus Marius Joseph Maria Kahlman, Dongen (NL); Berend Jan Willem Ter Weeme, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 77 days.

(21) Appl. No.: 18/277,480

(22) PCT Filed: Feb. 14, 2022

(86) PCT No.: PCT/EP2022/053490
§ 371 (c)(1),
(2) Date: Aug. 16, 2023

(87) PCT Pub. No.: WO2022/179872
PCT Pub. Date: Sep. 1, 2022

(65) Prior Publication Data
US 2024/0130020 A1    Apr. 18, 2024

(30) Foreign Application Priority Data

Feb. 23, 2021  (EP) .................................. 21158580

(51) Int. Cl.
*H05B 45/30*    (2020.01)
*H05B 45/10*    (2020.01)
(Continued)

(52) U.S. Cl.
CPC ............. *H05B 45/44* (2020.01); *H05B 45/10* (2020.01); *H05B 47/17* (2020.01)

(58) Field of Classification Search
CPC ........ H05B 45/10; H05B 45/20; H05B 45/30; H05B 45/32; H05B 45/325; H05B 45/37;
(Continued)

(56) References Cited

U.S. PATENT DOCUMENTS

2008/0272743 A1    11/2008  Ackermann et al.
2010/0253302 A1*   10/2010  Otte ....................... H05B 45/46
                                                                315/297
(Continued)

FOREIGN PATENT DOCUMENTS

JP    2010517500 A    5/2010
JP    2011504075 A    1/2011
(Continued)

*Primary Examiner* — Long Nguyen

(57) ABSTRACT

The invention relates to a lighting unit comprising a power converter for providing a regulated power to a first LED load where the first LED load comprises at least one LED, wherein the first LED load is coupled to the power converter, a series combination of a first capacitor and a first switch coupled in series with each other, wherein the series combination is coupled in parallel with the LED load, wherein the power converter is arranged to operate in a first mode, provide a first amount of the regulated power to the first LED load, and wherein the first switch is closed, and in a second mode, provide a second amount of the regulated power to the first LED load, wherein the second amount of the regulated power to the first LED load is lower than the first amount of the regulated power to the first LED load, and wherein the first switch is opened.

20 Claims, 4 Drawing Sheets

(51) Int. Cl.
  *H05B 45/44*    (2020.01)
  *H05B 47/17*    (2020.01)
(58) Field of Classification Search
  CPC .. H05B 45/3725; H05B 45/395; H05B 45/40;
           H05B 45/44; H05B 45/46; H05B 47/10;
                                      H05B 47/17
  See application file for complete search history.

(56)          References Cited

U.S. PATENT DOCUMENTS

2013/0154484 A1    6/2013  Xu
2016/0212815 A1*   7/2016  Watanabe .............. H05B 45/44

FOREIGN PATENT DOCUMENTS

JP       2016134282 A    7/2016
TW         201318469 A    5/2013

* cited by examiner

MULTI-CHANNEL DRIVER WITH SWITCHABLE BY PASS CAPACITORS

CROSS-REFERENCE TO PRIOR APPLICATIONS

This application is the U.S. National Phase application under 35 U.S.C. § 371 of International Application No. PCT/EP2022/053490, filed on Feb. 14, 2022, which claims the benefit of European Patent Application No. 21158580.7, filed on Feb. 23, 2021. These applications are hereby incorporated by reference herein.

FIELD OF THE INVENTION

The invention relates to a lighting unit. In particular, the invention relates to a lighting unit that provides an improved dimming with a reduced shift in color point.

BACKGROUND OF THE INVENTION

Nowadays the use of light emitting diodes, LEDs, as a light source for general illumination is a common practice. Many different implementations now exist where LEDs are used to provide a desired light color and intensity. It is desired that the light intensity of the LEDs can be controlled to vary from a maximum light output until a light output as low as possible.

A common practice to reduce the light output of the LEDs is to reduce the average current through the LEDs by modulating the current through the LEDs by pulse width modulation, PWM, or by reducing the amplitude of the current, which is called amplitude modulation. The disadvantage of using amplitude modulation is that at deep dimming i.e. at around 10% or lower of the maximum LED current, a color shift may occur in the color of the light generated by the LEDs. In some cases, at 5% light output, the color temperature may change with 450 K. At higher light output intensities, this color shift is less severe. If a single LED string is used emitting a light with a single color temperature, this color temperature will change when the intensity is lowered when amplitude modulation is applied.

It is a goal of the invention to provide a LED light source that has a more stable color temperature over the dimming range of the light source.

SUMMARY OF THE INVENTION

It is an objective of the invention to provide a lighting unit that provides an improved color consistency when the light output is dimmed such that no or less change in color or color temperature is observed by a user when the light output is reduced.

To overcome this concern, in a first aspect of the invention, a lighting unit is provided comprising:
  a power source for providing a regulated power to a first LED load;
  the first LED load comprising at least one LED, wherein the first LED load is coupled to the power source;
  a series combination of a first capacitor and a first switch coupled in series with each other, wherein the series combination is coupled in parallel with the LED load, wherein the power source is arranged to operate:
  in a first mode, provide a first amount of the regulated power to the first LED load, and wherein the first switch is closed, and
  in a second mode, provide a second amount of the regulated power to the first LED load, wherein the second amount of the regulated power to the first LED load is lower than the first amount of the regulated power to the first LED load, and wherein the first switch is opened,
  wherein the power converter is arranged to transition from the second mode to the first mode by controlling the first switch in a linear mode of operation.

This lighting unit has an LED load that is connected to a power source that provides the power to the LED load. In parallel with the LED load is a capacitor for smoothing out the current through the LED load.

It is an insight of the inventors that especially during deeper dimming of the light output, the color or color temperature shifts the most from the desired color or color temperature. The shift in color or color temperature is further referred to as a color point shift. It is desired to provide a PWM of the LED current at the dimming levels to provide the lowest color point shift possible. This can be done in the best way if no capacitance is in parallel with the LED load because a capacitor will reduce the modulation depth of a PWM current. At deeper dimming levels, where total, or significant, PWM of the LED load current is desired, the invention disconnects the capacitor by opening the switch in series with the capacitor. The power through the first LED load is measured or determined and based on the power exceeding a threshold, it is determined to open or close the switch in series with the capacitor. When the power to the first LED load is, for example, below a first threshold, indicating a dimming is taking place, the first switch is opened and when the power to the first LED load is above the first threshold, indicating that no or a little dimming is taking place, the first switch is closed. When the power converter transitions from the second mode to the first mode, the first LED load is shunted by the (partially) discharged first capacitor. Until the first capacitor has charged up sufficiently, the first LED load will not emit light. This results in a dark period during the transition from the second mode to the first mode. This may be observed by a user as a flicker and is undesired. To overcome this problem, the invention provides an improved control of the first switch. During the transition from the second mode to the first mode, the first switch is operated in its linear mode of operation. This prevents that all the current provided by the power converter would flow through the capacitor and allows a part of the current to flow through the first LED load, thereby reducing or even eliminate the dark period.

When no, or a limited amount of, dimming is performed, it may be desirable to keep the capacitor in parallel with the LEDs so that the current through the LED load is filtered and smoothened. This can be beneficial in environments where high frequency flicker e.g. the frequency of the PWM needs to be avoided at a high light output when, for example, used near a barcode scanner.

In a further example, the lighting unit further comprises:
  a second switch for regulating a current through the first LED load, wherein the first LED load is coupled in series with the power source and the second switch.
  a second LED load comprising at least one LED, wherein the power source is arranged to provide the regulated power to the second LED load;
  a series combination of a second capacitor and a third switch coupled in series with each other, wherein the series combination is coupled in parallel with the second LED load;

a fourth switch for regulating a current through the second LED load, wherein the second LED load is coupled in series with the power source and the fourth switch, wherein the power source is adapted to provide a regulated power to the second LED load and wherein the power source is arranged to operate:

in a third mode, provide a first amount of the regulated power to the second LED load, and wherein the third switch is closed, and in a fourth mode, provide a second amount of the regulated power to the second LED load, wherein the second amount of the regulated power to the second LED load is lower than the first amount of the regulated power to the second LED load, and wherein the third switch is opened.

Two LED strings in parallel and having their own respective parallel capacitor also suffer from the color point shift over the dimming range. In this example, each LED string has its own respective capacitor and its respective switch in series with the corresponding capacitor. When the power to the second LED load is, for example, below a second threshold, indicating that dimming is taking place, the third switch is opened and when the power to the first LED load is above the second threshold, indicating that no, or a limited amount of, dimming is taking place, the third switch is closed. In this example, the first and second LED load can independently determine whether to open or close their respective first and fourth switch. This can be very interesting in the case that the control of the first switch is done close to the first LED load and the control of the fourth switch is done close to the second LED load. This can result in the control of the switch, the capacitor, the switch and the LED load for either of the first and second LED load to be integrated together or at least in close proximity e.g. on the same printed circuit board.

The use of the second switch and the fourth switch allows for independent current control of the currents flowing through each LED load by modulating the current flowing through the LED load.

Another possibility is that both the first switch and the third switch are controlled by a single controller. This may result in the first switch and the third switch being turned on and off simultaneously.

In a further example, the lighting unit further comprises a first unidirectional element and preferably a second unidirectional element, wherein the first unidirectional element is arranged to provide the regulated power to the first LED load and the first capacitor, and wherein the second unidirectional element is arranged to provide the regulated power to the second LED load and the second capacitor.

Using the first unidirectional element to provide the regulated power to the first LED load and the first capacitor, a difference in string voltage between the first LED load and the second LED load is made possible. Without the first unidirectional element, an undesired current can flow from e.g. the first capacitance coupled to the first LED load with a higher string voltage to the second LED load with a lower string voltage.

In a further example, the power source is a current source arranged to provide a regulated current.

Preferably, the power source is a current source because the light output of the LEDs in the LED loads is directly related to the amount of current flowing through the LEDs. The current through the first LED load and the second LED load can be used to determine if the first switch and/or the second switch need to be opened or closed. The current through the first LED load and the second LED load can be a representation of the power provided by the power source to the first LED load and the second LED load.

In a further example, the lighting system comprises a fifth switch coupled between an output of the current source and a ground reference such that no regulated current is provided to the first LED load.

The addition of the fifth switch can allow for a deeper dimming of the light output of the first LED load and the second LED load. The fifth switch can shunt the current provided by the current source away from the first LED load and the second LED load.

In a further example, the first LED load comprises a red LED.

In a further example, the first LED load comprises a phosphor converted LED.

In a further example, the second LED load comprises a phosphor converted LED.

The first LED load and the second LED load may comprise several kind of LED loads. Examples provided are red, amber, green or blue LEDs, but also phosphor converter LEDs to create a warm white or cold white effect.

In a further example, a string voltage of the first LED load is larger than a string voltage of the second LED load.

In the lighting circuit according to the invention, it is allowed to have the first string voltage being larger than the second string voltage allowing more design freedom when designing the LED loads.

In a further example, the lighting unit comprises a controller for controlling the first switch and the second switch.

A single controller can be used to control the first and second switches. The controller can also be used for controlling the third, the fourth and the fifth switch. It is also possible that the controller comprises of several building blocks, where each building block is used to control a single switch. This allows local integration of the building block near a corresponding switch.

In a further example, the controller is arranged to provide a dimming function of a light output of the first LED load and wherein the controller is arranged to control the second switch to modulate the current through the LED load.

The controller can be used to receive a dimming signal that allows the lighting unit to perform the dimming functionality.

In a further example, the controller is further arranged to control the third switch and the fourth switch.

In a further example, the controller is arranged to provide a dimming function of a light output of the second LED load and wherein the controller is arranged to control the third switch to modulate the current through the LED load.

Similar to providing a dimming functionality for a single LED load, the controller can also be used to receive a dimming signal that allows the lighting unit to perform the dimming functionality for both the first LED load and the second LED load.

In a further example, the power source is adapted to provide a maximum output power and wherein the power source is arranged to operate in the second mode when the regulated power is lower than 25% of the maximum output power, preferably lower than 10% of the maximum output power.

Below 25% of the maximum output power of the power source, a threshold can be reached that would indicate that the power source operates in the second mode. This allows the capacitor in the LED load to be disconnected by opening the first and/or fourth switch.

Preferably, this threshold lies below the 10% of the maximum output power of the power source, but could also be in the range of 10% to 25% of the maximum output power of the power source, such as 15%, 20%.

In a further example, the first switch comprises a semiconductor switch.

Preferably, the first switch is a semiconductor switch such as a bipolar transistor or a field effect metal oxide transistor, MOSFET. The second, third, fourth and fifth switches can also be a semiconductor switch.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
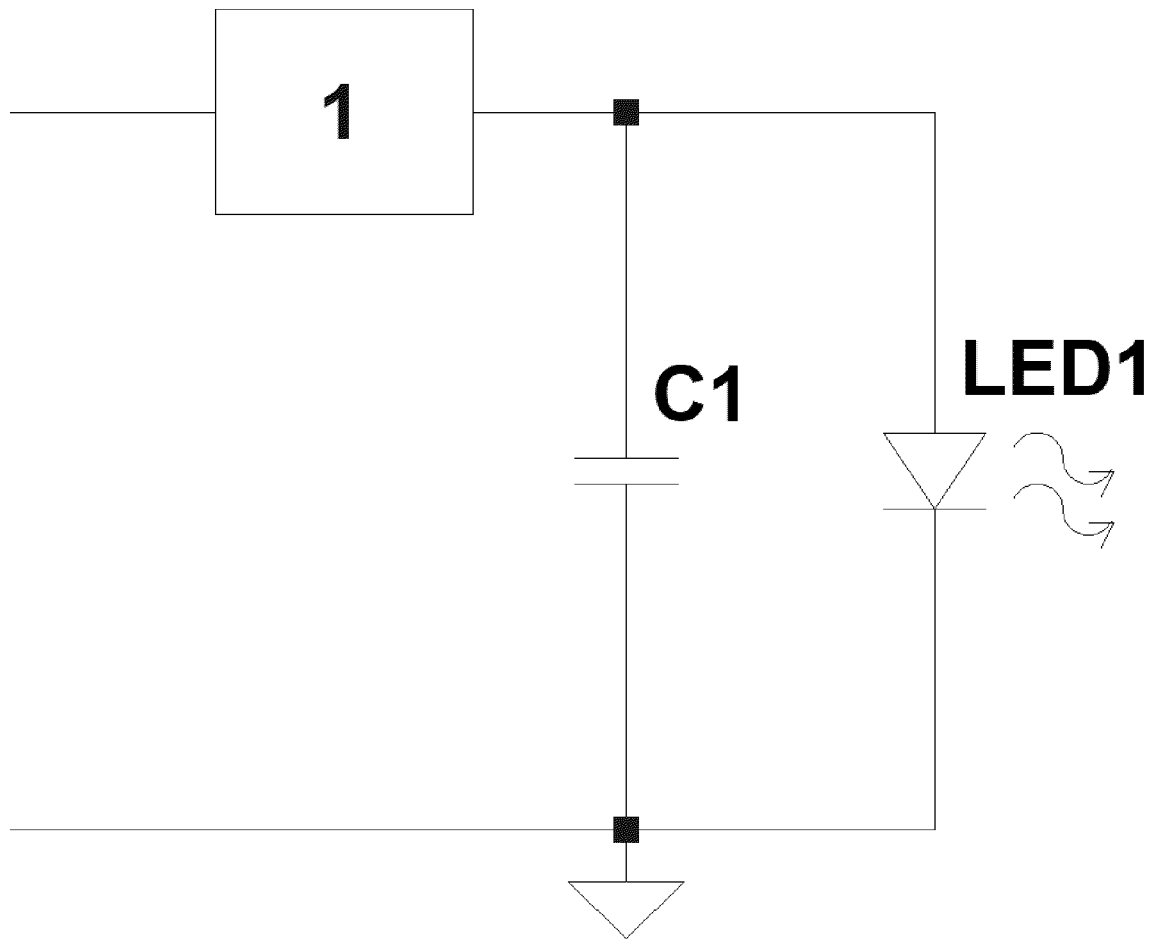
FIG. 1 shows an example of a current implementation of a lighting unit.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should also be understood that the Figures are merely schematic and are not drawn to scale. It should also be understood that the same reference numerals are used throughout the Figures to indicate the same or similar parts.

FIG. 1 shows an example of a lighting unit as it is currently being implemented. A power source 1 is used to convert a primary power source into a regulated power for a load. The primary power source can for example be a regular mains power supply operating at 230 V 50 Hz or 120 V 60 Hz. Alternatively, the primary power source can be a DC power source such as a battery or a DC grid. The regulated power to the load is provided to an LED load LED1 and a capacitor C1. The capacitor C1 is coupled in parallel with the LED load LED1 to filter out any ripple current that would otherwise flow through the LED load LED1. A current flows through the LED load LED1, which results in a specific light output. For the light output to be reduced, the current through the LED load LED1 needs to be reduced. This can be done by lowering the amplitude of the current, which is generated by the power converter 1. The amplitude of the current can be lowered in at least two ways, though more ways are possible. The first way is to lower the amplitude of the current by amplitude modulation. The current amplitude is then gradually decreased until a desired amount of current is reached. This amplitude modulation has a severe drawback. The lower the current level is, the higher a color point shift of the light outputted by the LED load LED1 will be. The light output color temperature is in the first instance determined by the type of LED used. Changing the amplitude of the current results in a color point shift.

Using a pulse width modulation on the current through the LED load LED1 results in an unchanged amplitude of the LED current, while the pulse width determines the average current that is provided to the LED load LED1. It is therefore preferred to use a pulse width modulated current to the LED load LED1 to achieve dimming of the light output. The use of the term pulse width modulation is meant in its broadest meaning, such that the on-off ratio of the pulses over time determines the average LED current, and there is no need to have a fixed frequency of pulse width modulation, for example. Consequently, pulse width modulation is here meant to include, for example, pulse frequency modulation, pulse duration modulation, pulse position modulation, binary code modulation. In general, pulse width modulation includes any method of dimming the LED current that has a reduced color shift when compared to amplitude dimming of the LED current. The pulse width modulated current can be generated by the power converter 1. This pulse width modulated current is provided to the capacitor C1 and the LED load LED1. The capacitor C1 is used to filter out the ripple of the current going to the LED load LED1 so that a stable LED current is generated. This is beneficial in situations where flicker is to be avoided. Camera's and barcode scanners can respond to light with a flicker frequency that is generated by the pulse width modulation. When dimming is implemented, the capacitor C1 causes the pulse width modulated current to behave more like an amplitude modulation, resulting in a shift in the color point of the light emitted by the LED load LED1. An improved lighting unit is desired that can provide for a low flicker to provide a good operation where cameras or barcode scanners are used, and for a reduced color shift when the light output is dimmed.

Figure 2:
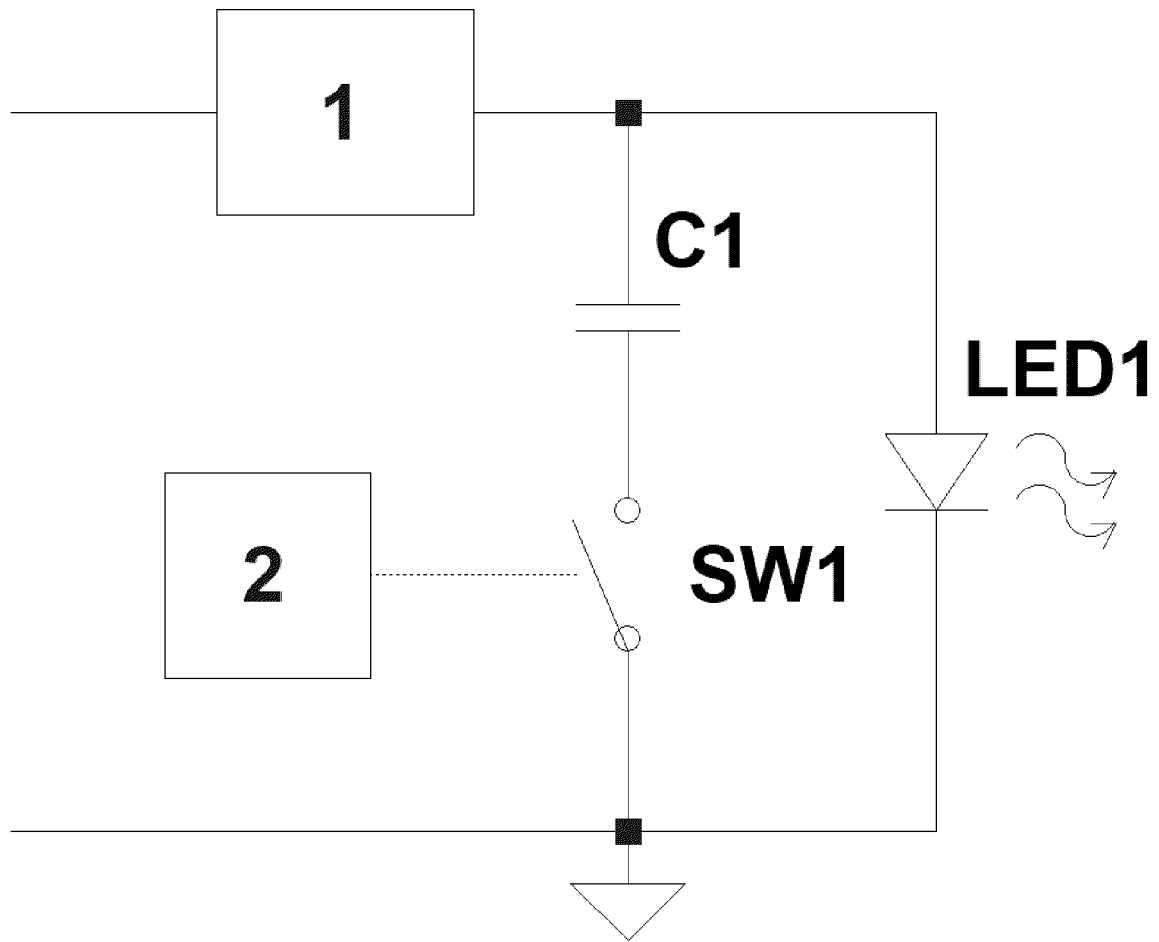
FIG. 2 shows an embodiment of a lighting unit according to the invention.

FIG. 2 shows an example of an embodiment according to the invention. A power converter 1 provides power to the LED load LED1 and the capacitor C1. In series with the capacitor C1 is a first switch SW1. The series combination of the capacitor C1 and the first switch SW1 is coupled in parallel with the LED load LED1. The power converter is arranged to provide a dimming of the light output of the LED load LED1 by lowering the current to the LED load LED1. In a first mode of operation of the power converter 1, the power converter 1 provides a pulse width modulated current to the LED load LED1 and the capacitor C1. In this first mode of operation, the first switch SW1 is closed. The first mode of operation is, for example, where the power converter 1 provides a power to the LED load LED1 such that the light output of the LED load LED1 is in a range of between a maximum light output and a light output of 25%.

When the light output is reduced, for example below 25%, the power converter 1 may operate in a second mode of operation. In this second mode of operation, the current to the LED load LED1 is further reduced. In this second operation mode, the first switch SW1 is opened so the capacitor C1 cannot receive any power provided by the power converter 1. The filtering and the stabilization of the current through the LED load LED1, which is done by capacitor C1 in the first mode of operation is not performed in the second mode of operation because the capacitor C1 is unable to filter and stabilize the current through the LED load LED1. Instead, now the pulse width modulated current generated by the power converter 1 is directly provided to the LED load LED1 which will cause a flicker in the light output. Because the light output is dimmed, the impact of the flicker of the light is now not significant anymore for e.g. cameras or barcode scanners.

The pulse width modulated current may maintain a constant amplitude over the whole dimming range and the average current through the LED load LED1 may be controlled by controlling the duty cycle of the current. Alternatively, the amplitude of the current may be altered over the dimming range in conjunction with the control of the duty cycle. This combination of amplitude modulation and pulse width modulation will still provide for a reduction of the color point shift.

The first switch SW1 may be controlled by a controller 2 that determines whether the power converter 1 operates in the first mode of operation or the second mode of operation. If the controller 2 determines that the power converter 1 operates in the first mode of operation, the controller 2 closes the first switch SW1. If the controller 2 determines that the power converter 1 operates in the second mode of operation, the controller 2 opens the first switch SW1.

Figure 3:
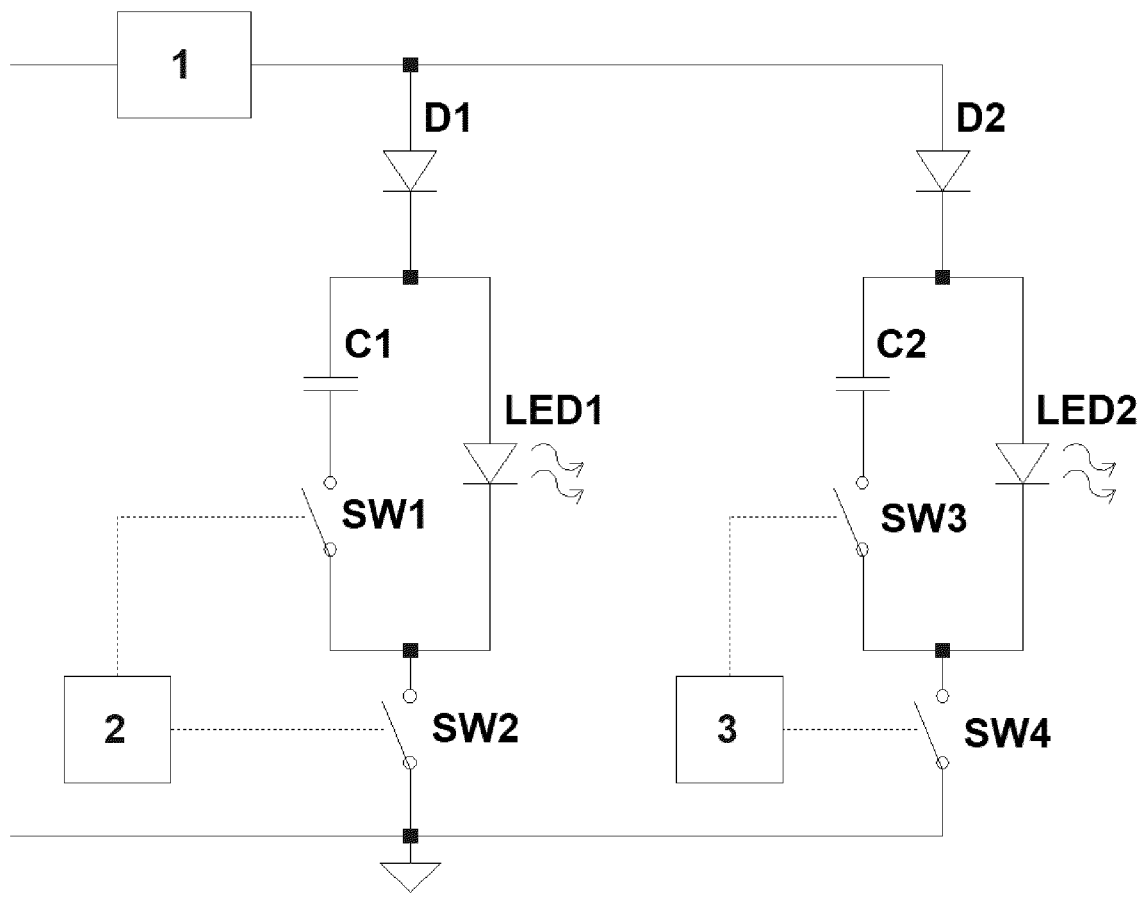
FIG. 3 shows an embodiment of a lighting unit according to the invention.

In FIG. 3, another example of the lighting unit according to the invention is provided. The lighting unit has a power converter 1, that provides power to a first load and a second load. The first load may be the first LED load LED1 and the second load may be a second LED load LED2.

Additionally, the power converter 1 may provide power to the first capacitor C1 and second capacitor C2. In series with the first capacitor C1 is a first switch SW1. The series combination of the first capacitor C1 and the first switch SW1 is coupled in parallel with the first LED load LED1. The power converter 1 is arranged to provide a steady power to the first LED load LED1 and the second LED load LED2. It is desired to regulate the current through the first LED load LED1 and the second LED load LED2 independently from each other. A second switch SW2 is used to regulate the current the current through the first LED load LED1. The second switch SW2 is placed in series with the power converter 1 and the first LED load LED1.

In series with the second capacitor C2 is a third switch SW3. The series combination of the second capacitor C2 and the third switch SW3 is coupled in parallel with the second LED load LED2. A fourth switch SW4 is used to regulate the current the current through the second LED load LED2. The fourth switch SW4 is placed in series with the power converter 1 and the second LED load LED2.

Preferably, the current regulation performed by the second switch SW2 and the fourth switch SW4 is done by controlling the switches such that a current regulation is done by pulse width modulating the current through the LED loads.

Again, the power converter can operate in the first mode of operation and the second mode of operation. In the first mode of operation of the power converter 1, the power converter 1 provides a current to the first LED load LED1 and the first capacitor C1. In this first mode of operation, the first switch SW1 is closed.

The first mode of operation is, for example, where the power converter 1 provides a power to the first LED load LED1 such that the light output of the first LED load LED1 is in a range of between a maximum light output and a light output of 25%, preferably a light output of 10%.

When the light output of the first LED load LED1 is reduced, for example below 25%, the power converter 1 may operate in the second mode of operation. In this second mode of operation, the current to the first LED load LED1 is further reduced. In this second operation mode, the first switch SW1 is opened so the first capacitor C1 cannot receive any power provided by the power converter 1.

The power converter 1 is further adapted to operate in a third mode of operation and a fourth mode of operation.

In the third mode of operation of the power converter 1, the power converter 1 provides a current to the second LED load LED2 and the second capacitor C2. In this third mode of operation, the third switch is closed.

The third mode of operation is, for example, where the power converter 1 provides a power to the second LED load LED2 such that the light output of the second LED load LED2 is in a range of between a maximum light output and a light output of 25%, preferably a light output of 10%.

When the light output of the second LED load LED2 is reduced, for example, below 25%, the power converter 1 may operate in the fourth mode of operation. In this fourth mode of operation, the current to the second LED load LED2 is further reduced. In this fourth operation mode, the third switch SW3 is opened so the second capacitor C2 cannot receive any power provided by the power converter 1.

In the examples provided, the power to the first LED load LED1 and the second LED load LED2 are controlled in four modes of operation, allowing to e.g. only control the first switch SW1 or the third switch SW3. The operating modes may be combined such that the first switch SW1 and the third switch SW3 are opened or closed simultaneously. As an example, the light output for both the first LED load LED1 and the second LED load LED2 may be reduced so that the power converter 1 operates in the second and fourth modes of operation. In this example, the first switch SW1 and the third switch SW3 are opened at the same time.

A first controller 2 may be used for controlling the first switch SW1 and the second switch SW2. A second controller 3 may be used for controlling the third switch SW3 and the fourth switch SW4. The first controller 2 can be placed close to the first switch SW1 and the second switch SW2. The second controller 3 can be placed close to the third switch SW3 and the fourth switch SW4. This could allow an integration of the switches and the controller into integrated circuits.

Alternatively, a single controller 2 can be used to control the first, second, third and fourth switches. The single controller 2 can also be used for controlling the power converter 1. A single controller 2 can allow an easier control of the switches and power converter 1 because all control parameters are sent to a single control unit.

The first controller 2, the second controller 3 or the single controller 2 may be any, but not limited to, of a microcontroller, field-programmable gate array, FPGA, or a discrete control solution.

Preferably, the lighting unit has a first unidirectional element D1 that allows the regulated power from the power converter 1 to be provided to the first LED load LED1. This first unidirectional element D1 is placed between the output of the power converter 1 and to an input of the first LED load LED1. The input of the first LED load LED1 can be the anode of the LED.

Preferably, the string voltage of the first LED load LED1 is larger than the string voltage of the second LED load LED2. The first unidirectional element D1 will prevent a current to flow from the first capacitor C1 to the second LED load LED2, which would otherwise flow because of the voltage difference.

Preferably, the lighting unit also has a second unidirectional element D2 that allows the regulated power from the power converter 1 to be provided to the second LED load LED2. This second unidirectional element D2 is placed between the output of the power converter 1 and to an input of the second LED load LED2. The input of the second LED load LED2 can be the anode of the LED. The functionality of the second unidirectional element D2 is similar to that of the unidirectional element D1 but now combined with the second LED load LED2 instead of the first LED load LED1.

The use of the first and second unidirectional elements allow a user to install any type of LED load without taking a difference of string voltages into consideration.

The first unidirectional element D1 and the second unidirectional element D2 are shown as diodes but a MOSFET can also be used, which blocks the current in the reverse biased situation, but allows the current to flow when forward biased. This may reduce the losses in the unidirectional elements.

Preferably, the unidirectional elements are used when any of the first, second, third or fourth switches is a MOSFET. A MOSFET has an intrinsic body diode which can cause the undesired current to flow from e.g. the first capacitor C1 to the second LED load LED2.

Figure 4:
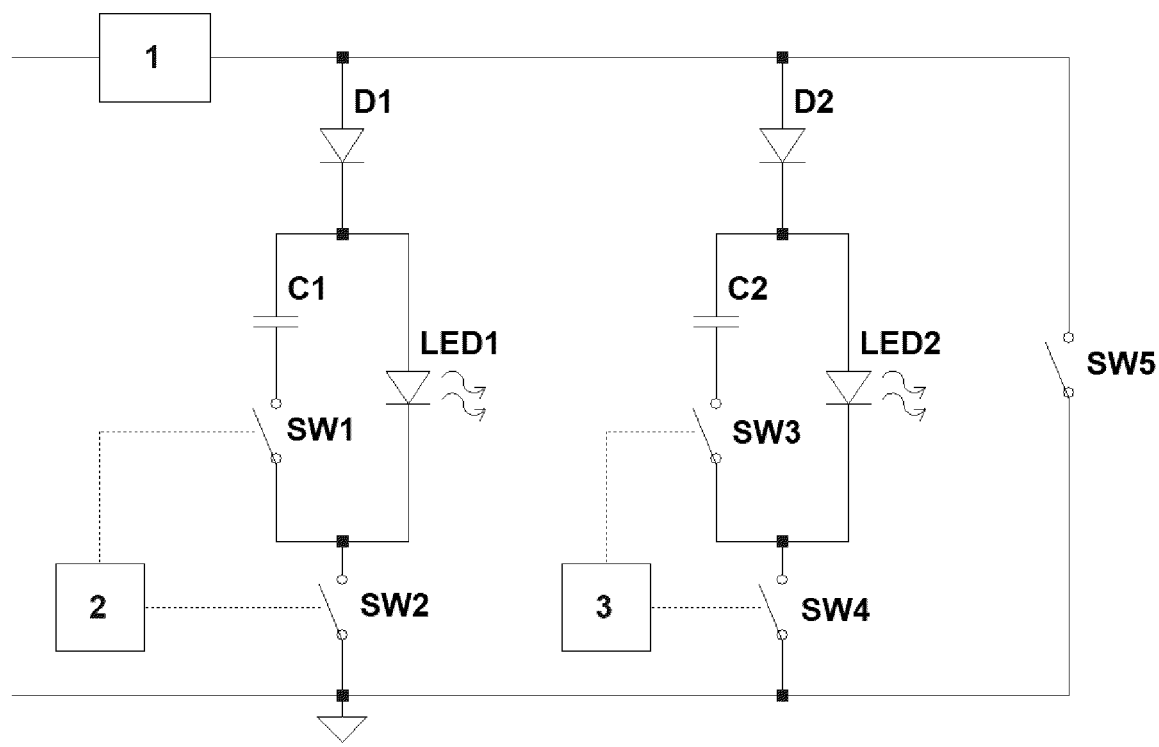
FIG. 4 shows a further improvement of an embodiment of a lighting unit according to the invention.

FIG. 4 shows an improvement of the example of the lighting unit provided in FIG. 3. The features with the same reference numerals as in FIG. 3 are identical. An additional fifth switch SW5 is provided. The fifth switch SW5 is placed between the output of the power converter 1 and a return path, e.g. a ground reference. The fifth switch SW5 effectively shunts the first LED load LED1 and the second LED load LED2 such that when the fifth switch SW5 is closed, no current will flow from the power converter 1 to the first LED load LED1 and the second LED load LED2.

In the examples provided, the LED load LED1 is shown and described as a single LED but it is to be understood that multiple LEDs can be used as the LED load LED1. The LEDs can be coupled in different configurations such as in a series or parallel configuration or a combination thereof.

In the examples provided, the second switch SW2 and fourth switch SW4 are placed below the LED loads. It is to be understood that the second switch SW2 and the fourth switch SW4 can be placed above the LED loads such that they can regulate the current through the first LED load LED1 and the second LED load LED2. The shown position of the second switch SW2 and the fourth switch SW4 are the preferred position because at this position, the switches can be easily controlled.

In the examples provided, any of the first, second, third and the fourth switches can be any of, but not limited to, semiconductor switches e.g. MOSFETs or bipolar transistors or electromechanical switches.

In the examples provided, the power converter 1 may be a current source or a voltage source. A current source is a power converter 1 that regulates the current at the output of the power converter 1. The current source tries to keep the generated current at a constant level and the voltage at the output of the current source is a result of the amount of the regulated current and the impedance of the load. A voltage source is a power converter 1 that regulates the voltage at the output of the power converter 1. The voltage source tries to keep the generated voltage at a constant level and the current at the output of the voltage source is a result of the amount of the regulated voltage and the impedance of the load.

In the examples provided, it is preferred that the power converter 1 is arranged to transition from the second mode to the first mode by controlling the first switch SW1 in a linear mode of operation.

It may also be preferred that the power converter 1 is arranged to transition from the second mode to the first mode by controlling the third switch SW3 in a linear mode of operation.

In the examples provided, the first controller 2, second controller 3 or the single controller 2 may be used to control the second switch SW2 to provide a modulation of the current through the first LED load LED1 such that a dimming function of the light output of the first LED load LED1 is achieved. Additionally, or alternatively, the first controller 2, second controller 3 or the single controller 2 may be used to control the fourth switch SW4 to provide a modulation of the current through the second LED load LED2 such that a dimming function of the light output of the second LED load LED2 is achieved.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting unit comprising:
a power converter for providing a regulated power to a first LED load;
the first LED load comprising at least one LED, wherein the first LED load is coupled to the power converter;
a series combination of a first capacitor and a first switch coupled in series with each other, wherein the series combination is coupled in parallel with the first LED load;
a fifth switch coupled between an output of the power converter and a ground reference, such that no regulated power is provided to the first LED load,
wherein the power converter is arranged to operate:
in a first mode, provide a first amount of the regulated power to the first LED load, and wherein the first switch is closed, and
in a second mode, provide a second amount of the regulated power to the first LED load, wherein the second amount of the regulated power to the first LED load is lower than the first amount of the regulated power to the first LED load, and wherein the first switch is opened,
wherein the power converter is arranged to transition from the second mode to the first mode by controlling the first switch in a linear mode of operation.

2. The lighting unit as claimed in claim 1, further comprising:
a second switch for regulating a current through the first LED load, wherein the first LED load is coupled in series with the power converter and the second switch;
a second LED load comprising at least one LED, wherein the power converter is arranged to provide the regulated power to the second LED load;
a second series combination of a second capacitor and a third switch coupled in series with each other, wherein the second series combination is coupled in parallel with the second LED load;
a fourth switch for regulating a current through the second LED load, wherein the second LED load is coupled in series with the power converter and the fourth switch,
wherein the power converter is adapted to provide the regulated power to the second LED load and wherein the power converter is arranged to operate:
in a third mode, provide a first amount of the regulated power to the second LED load, and wherein the third switch is closed, and in a fourth mode, provide a second amount of the regulated power to the second LED load, wherein the second amount of the regulated power to the second LED load is lower than the first amount of the regulated power to the second LED load, and wherein the third switch is opened.

3. The lighting unit as claimed in claim 2, further comprising a first unidirectional element and a second unidirectional element, wherein the first unidirectional element is arranged to provide the regulated power to the first LED load and the first capacitor, and wherein the second unidirectional element is arranged to provide the regulated power to the second LED load and the second capacitor.

4. The lighting unit as claimed in claim 1, wherein the power converter is a current source arranged to provide a regulated current.

5. The lighting unit according to claim 1, wherein the first LED load comprises a red or amber LED.

6. The lighting unit according to claim 1, wherein the first LED load comprises a phosphor converted LED.

7. The lighting unit according to claim 2, wherein the second LED load comprises a phosphor converted LED.

8. The lighting unit according to claim 2, wherein a string voltage of the first LED load is larger than a string voltage of the second LED load.

9. The lighting unit according to claim 2, comprising a controller for controlling the first switch and the second switch.

10. The lighting unit according to claim 9, wherein the controller is arranged to provide a dimming function of a light output of the first LED load and wherein the controller is arranged to control the second switch to modulate the current through the first LED load.

11. The lighting unit according to claim 9, wherein the controller is further arranged to control the third switch and the fourth switch.

12. The lighting unit according to claim 11, wherein the controller is arranged to provide a dimming function of a light output of the second LED load and wherein the controller is arranged to control the fourth switch to modulate the current through the second LED load.

13. The lighting unit according to claim 1, wherein the power converter is adapted to provide a maximum output power, and wherein the power converter is arranged to operate in the second mode when the regulated power is lower than 25% of the maximum output power.

14. The lighting unit according to claim 1, wherein the first switch comprises a semiconductor switch.

15. A lighting unit comprising:
a power converter for providing a regulated power to a first LED load;
the first LED load comprising at least one LED, wherein the first LED load is coupled to the power converter;
a second switch for regulating a current through the first LED load, wherein the first LED load is coupled in series with the power converter and the second switch;
a second LED load comprising at least one LED, wherein the power converter is arranged to provide the regulated power to the second LED load;
a series combination of a first capacitor and a first switch coupled in series with each other, wherein the series combination is coupled in parallel with the first LED load, wherein the second switch is coupled in series with the series combination
wherein the power converter is arranged to operate:
in a first mode, provide a first amount of the regulated power to the first LED load, and wherein the first switch is closed, and
in a second mode, provide a second amount of the regulated power to the first LED load, wherein the second amount of the regulated power to the first LED load is lower than the first amount of the regulated power to the first LED load, and wherein the first switch is opened,
wherein the power converter is arranged to transition from the second mode to the first mode by controlling the first switch in a linear mode of operation,
wherein a string voltage of the first LED load is larger than a string voltage of the second LED load.

16. The lighting unit as claimed in claim 15, further comprising:
a second series combination of a second capacitor and a third switch coupled in series with each other, wherein the second series combination is coupled in parallel with the second LED load;
a fourth switch for regulating a current through the second LED load, wherein the second LED load is coupled in series with the power converter and the fourth switch,
wherein the power converter is adapted to provide the regulated power to the second LED load and wherein the power converter is arranged to operate:
in a third mode, provide a first amount of the regulated power to the second LED load, and wherein the third switch is closed, and
in a fourth mode, provide a second amount of the regulated power to the second LED load, wherein the second amount of the regulated power to the second LED load is lower than the first amount of the regulated power to the second LED load, and wherein the third switch is opened.

17. The lighting unit as claimed in claim 16, further comprising a first unidirectional element and a second unidirectional element, wherein the first unidirectional element is arranged to provide the regulated power to the first LED load and the first capacitor, and wherein the second unidirectional element is arranged to provide the regulated power to the second LED load and the second capacitor.

18. The lighting unit according to claim 16, comprising a controller for controlling the first switch and the second switch.

19. The lighting unit as claimed in claim 15, wherein the power converter is a current source arranged to provide a regulated current.

20. The lighting unit as claimed in claim 19, further comprising a fifth switch coupled between an output of the current source and a ground reference such that no regulated current is provided to the first LED load.

* * * * *